US012664178B1

(12) United States Patent
Mortensen et al.

(10) Patent No.: US 12,664,178 B1
(45) Date of Patent: Jun. 23, 2026

(54) SYSTEMS AND METHODS FOR RECONCILING REPOSITORY DIFFERENCES VIA ENCRYPTED NETWORK COMMUNICATIONS

(71) Applicant: Veeva Systems Inc., Pleasanton, CA (US)

(72) Inventors: Marius K. Mortensen, Burlington (CA); Jared Ross Katz, San Francisco, CA (US); John Tanner, Bristol (GB); Matthew Zimmerman, Elgin, IL (US)

(73) Assignee: Veeva Systems Inc., Pleasanton, CA (US)

( * ) Notice: Subject to any disclaimer, the term of this patent is extended or adjusted under 35 U.S.C. 154(b) by 4 days.

(21) Appl. No.: 18/967,859

(22) Filed: Dec. 4, 2024

Related U.S. Application Data

(60) Provisional application No. 63/607,333, filed on Dec. 7, 2023.

(51) Int. Cl.
G06F 16/00 (2019.01)
G06F 16/23 (2019.01)
G06F 16/27 (2019.01)

(52) U.S. Cl.
CPC ............ G06F 16/273 (2019.01); G06F 16/23 (2019.01)

(58) Field of Classification Search
CPC .............................. G06F 16/273; G06F 16/27
See application file for complete search history.

(56) References Cited

U.S. PATENT DOCUMENTS

| | | | | |
|---|---|---|---|---|
| 7,076,485 B2 * | 7/2006 | Bloedorn | ............ | G06F 16/3346 |
| 2010/0205597 A1 * | 8/2010 | Bender | .................... | G06F 8/65 |
| | | | | 707/610 |
| 2012/0117120 A1 * | 5/2012 | Jacobson | ............ | G06F 16/2455 |
| | | | | 715/838 |
| 2023/0408433 A1 * | 12/2023 | Kosenka | ............ | G01N 33/1846 |

* cited by examiner

*Primary Examiner* — Cheryl Lewis

(57) ABSTRACT

A method for reconciling differences between a first repository and a second repository includes receiving a request to generate a network connection between the first repository and the second repository. The first repository is associated with the first application, and the second repository is associated with a second application. The method further includes receiving structured data and storing the structured data in the first repository. The method further modifying the structured data to encrypt the structured data. The method further includes providing the encrypted structured data to the second repository. The method further includes receiving updated structured data and storing the updated structured data in the first repository. The method further includes providing the encrypted updated structured data to the second repository. The method further includes receiving a request to delete the updated structured data stored in the first repository and deleting the updated structured data in the first repository.

20 Claims, 5 Drawing Sheets

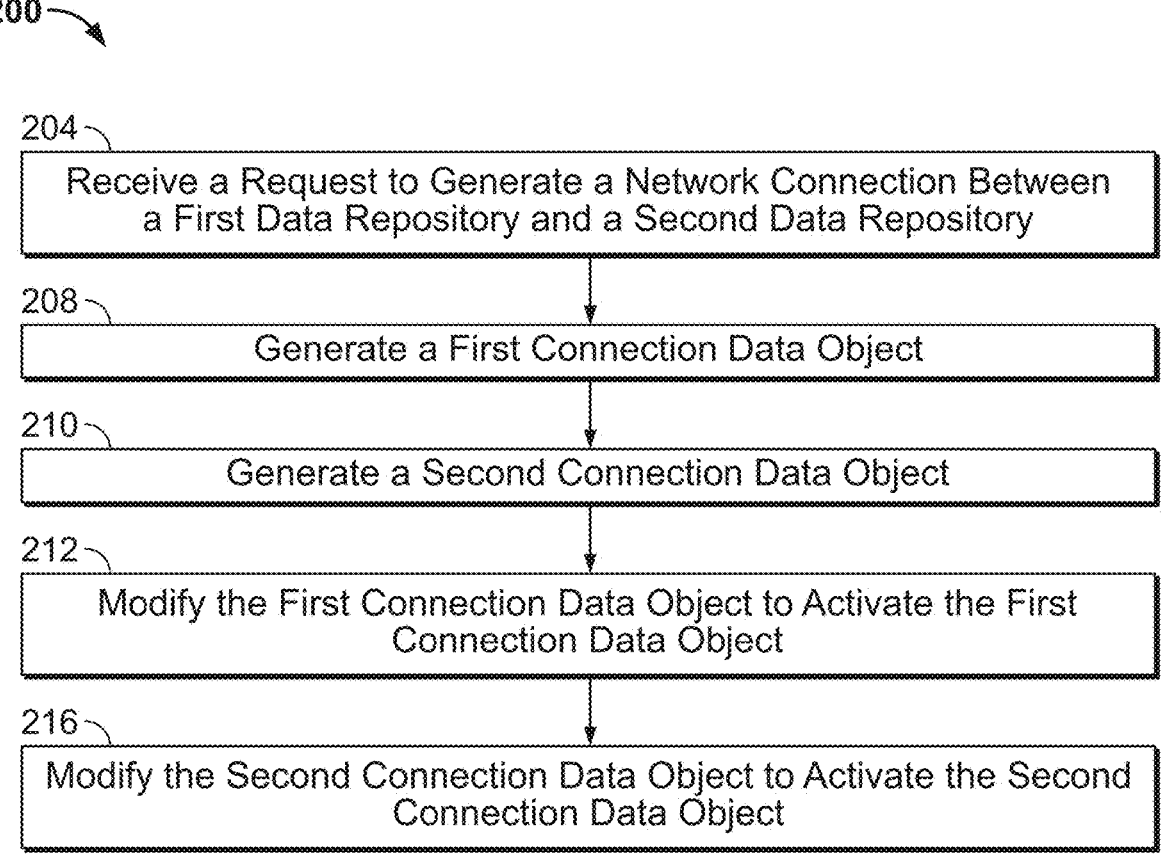

200

204
Receive a Request to Generate a Network Connection Between a First Data Repository and a Second Data Repository 208
Generate a First Connection Data Object 210
Generate a Second Connection Data Object 212
Modify the First Connection Data Object to Activate the First Connection Data Object 216
Modify the Second Connection Data Object to Activate the Second Connection Data Object

304
Receive New Structured Data in a First Data Repository

308
Modify the Structured Data

312
Provide the Modified Structured Data from the First Data Repository to the Second Data Repository 316
Store the Modified Structured Data in the Second Data Repository

400

404

Receive Updated Structured Data in a First Data Repository

408

Modify the Updated Structured Data

412

Provide the Modified Updated Structured Data from the First Data Repository to the Second Data Repository

416

Store the Modified Updated Structured Data in the Second Data Repository in Place of the Structured Data

500

504

Receive a Deletion of Structured Data in a First Data Repository

508

Provide an Indication the Structured Data was Deleted to the Second Data Repository

512

Add a Deletion Flag to the Structured Data of the Second Data Repository

SYSTEMS AND METHODS FOR RECONCILING REPOSITORY DIFFERENCES VIA ENCRYPTED NETWORK COMMUNICATIONS

CROSS-REFERENCE TO RELATED APPLICATIONS

This application claims priority to U.S. Provisional Patent Application No. 63/607,333, filed Dec. 7, 2023.

TECHNICAL FIELD

The present disclosure relates to systems and methods for reconciling repository differences via encrypted network communications.

BACKGROUND

Researchers, scientists, industry players, academics, government regulators, and other stakeholders are increasingly in need of efficient and simple ways to reconcile differences in data between repositories.

SUMMARY

One embodiment relates to a method for reconciling differences between a first repository and a second repository. The method includes receiving a request to generate a network connection between the first repository and the second repository. The first repository is associated with the first application, and the second repository is associated with a second application. The method further includes generating a first connection data object including a Boolean status field including a false value and modifying the Boolean status field to include a true value. The method further includes receiving structured data and storing the structured data in the first repository. The method further modifying the structured data to encrypt the structured data. The method further includes providing, in response to the Boolean status field including the true value, the encrypted structured data to the second repository. The method further includes receiving updated structured data and storing the updated structured data in the first repository. The method further modifying the updated structured data to encrypt the updated structured data. The method further includes providing, in response to the Boolean status field including the true value, the encrypted updated structured data to the second repository. The method further includes receiving a request to delete the updated structured data stored in the first repository and deleting the updated structured data in the first repository. The method further includes providing, in response to the Boolean status field including the true value, an indication of the deletion of the updated structured data to the second repository.

Another embodiment relates to a method for reconciling differences between a first repository and a second repository. The method includes receiving a request to generate a network connection between the first repository and the second repository. The method further includes generating a first connection data object including a first Boolean status field including a first false value and modifying the first Boolean status field to include a first true value. The method further includes generating a second connection data object including a second Boolean status field including a second false value and modifying the second Boolean status field to include a second true value. The method further includes receiving structured data and storing the structured data in the first repository. The method further includes providing, in response to the Boolean status field including the true value, the structured data to the second repository, and storing the structured data in the second repository. The method further includes receiving updated structured data and storing the updated structured data in the first repository. The method further includes providing, in response to the Boolean status field including the true value, the updated structured data to the second repository, and storing the updated structured data in the second repository. The method further includes receiving a request to delete the updated structured data stored in the first repository and deleting the updated structured data in the first repository. The method further includes providing, in response to the Boolean status field including the true value, an indication of the deletion of the updated structured data to the second repository. The method further includes modifying, in response to receiving the indication of deletion, the updated structured data of the second repository to include a deletion flag.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIG. 2 may be a flow diagram of a method for initiating a network connection between a first repository and a second repository, according to an example embodiment.

DETAILED DESCRIPTION

Figure 1:
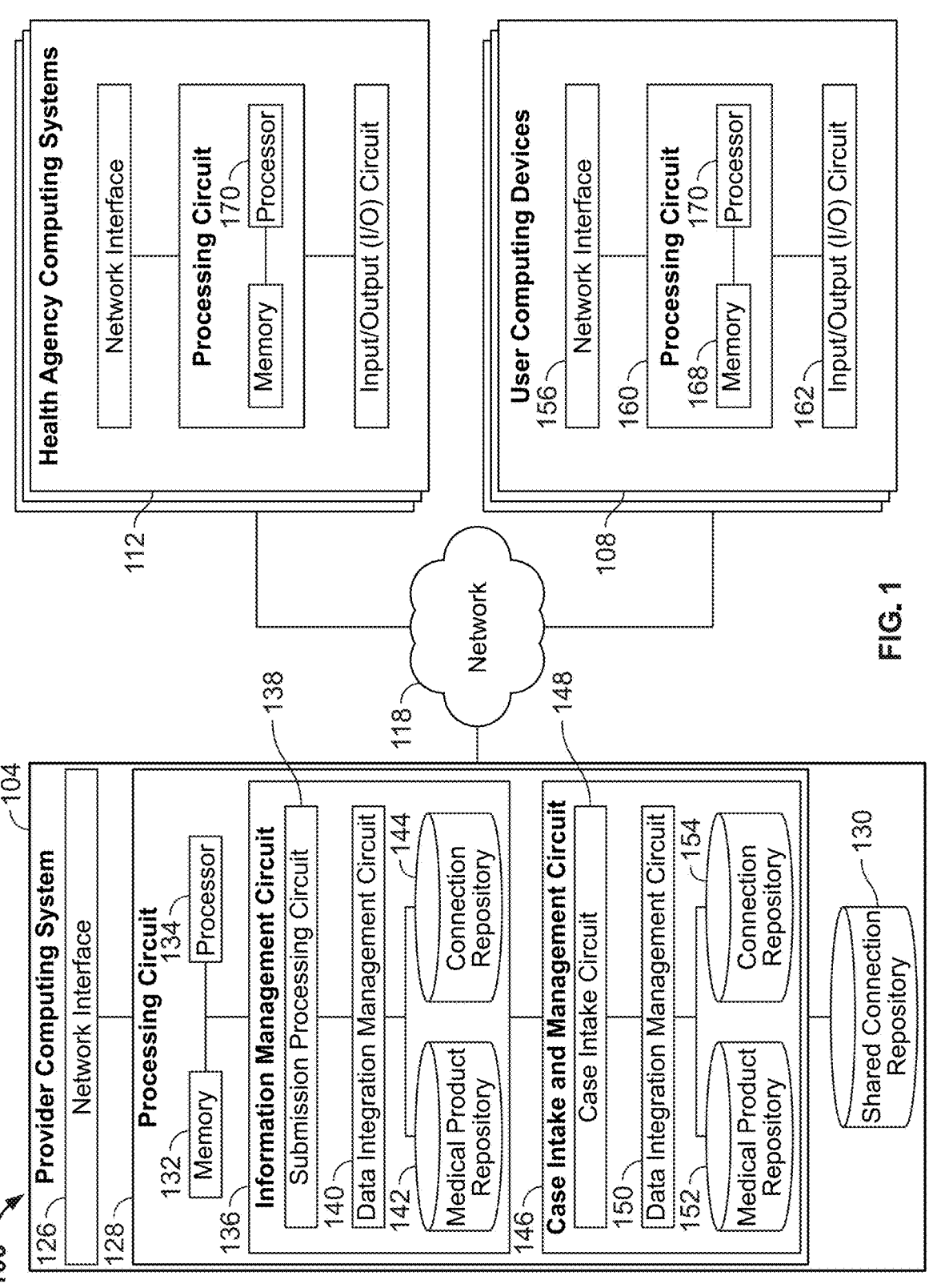
FIG. 1 may be a component diagram of a data reconciliation system, according to an example embodiment.

Referring generally to the figures, systems and methods for providing secure multi-tiered access to case datasets are disclosed. The systems and methods described herein provide for improved connectivity and reconciliation between medical data repositories, and thereby provide an improvement to the life sciences industry, as a whole. For instance, because the systems and methods described herein, automatically share differences in data between repositories by utilizing multiple connection data object and multiple data schemas (e.g., RIM medical product data schema and a Safety medical product data schema), of separate applications, which are mapped to one another, the present systems and methods provide for the automatic sharing of structured medical product data and automatic updates from one repository to another. In comparison, typical repositories of separate applications may be disconnected or send data packages which have to be manually parsed and analyzed to thereafter be added to another repository. This results in slow or inconsistent reconciliation between repositories that is not real-time, and often lacks the actual data of the other application. In comparison, the present systems and methods utilize multiple connection data objects which are activated and thereafter used to share structured data of one repository and application with another repository and application. In this regard, when new data is added to; existing data is modified; or existing data is deleted in the first repository, the second repository is automatically updated and the real-time data of the first repository is reflected in the second repository. This results in a technical improvement to repository data sharing and reconciliation, less memory and processing power to fix or corrected manual errors, and constant data-availability or up-time which allows for faster processing of individual case safety reports, as described further herein.

Likewise, the systems and methods described herein provide for an improvement to repository reconciliation systems by utilizing a deletion indication and flag to reflect structured data that has been deleted in the first repository in the second repository. For instance, typical systems may reflect a deletion of data in a first repository, by deleting the corresponding data in the second repository, which results in data gaps and inconsistencies in the second repository and second application. In comparison, the present systems and methods provide an indication, from the first repository to the second repository, that structured data was deleted in the first repository. Then, in response to receiving the indication, the second repository modifies the structured data to include a deletion flag, but still maintains the structured data (i.e., does not delete the structured data) because the structured data may be in use throughout the second application (e.g., to generate, process, and output case datasets). Accordingly, by doing so, the present systems and methods provide a technical improvement to data integrity and availability while still reflecting the differences in the repositories (e.g., via the deletion flag), thereby resulting in improved data availability, consistency, and overall reliability of the second application.

Additionally, by generating a certificate (e.g., a public key signed with the private key) and providing the certificate to the corresponding connection data object, in response to initiating data communications, the present systems and methods may provide for a multi-faceted reusability of newly setup data connections. For instance, the present systems and methods may provide for convenient and shorter repository connections, in response to the user providing the same certificate. In this regard, the systems and methods described herein may not need many of the typical requirements (e.g., subdomain, whitelisted addresses, etc.) and may reuse the already setup repository for a new data address. By doing so, the present systems and methods provide an improvement to repository networking setup and systems and require less processing power and memory by not having to repeatedly generate an additional key-pair and domain associated with the repository, as well as transfer the certificate to any other connection data objects.

As used herein, the term "event," "medical event," or "adverse event" can include any untoward medical occurrence which happens to either a patient or a subject in a clinical investigation or during regular use of a medical product that has been given to that person. For example, the "event," "medical event," or "adverse event" may encompass any signs which are unfavorable and unexpected for the patient or subject, including any abnormal laboratory findings such as a high blood pressure, a rapid heart rate, etc. The "event," "medical event," or "adverse event" could be symptoms, or a disease temporally associated with the use of a medical product and does not have to have been previously associated with that product. The term "event," "medical event," or "adverse event" can further encompass adverse reactions and serious adverse events such as death, life-threatening adverse experiences, inpatient hospitalization, congenital birth defects, disabilities, etc. Further, each "event," "medical event," or "adverse event" may be defined by the Medical Dictionary for Regulatory Activities (MedDRA) (or other medical code dictionaries) and associated with a specific MedDRA code. Moreover, "event information" "medical event information" "adverse event information" "event data" "medical event data" or "adverse event data" can include information associated with the event such as the date of onset of the event, the date of cessation of the event, the type of event, the dictionary (i.e., digital dictionary, medical dictionary, digital medical dictionary, etc.) or medical term (e.g., MedDRA term), the dictionary or medical code (e.g., MedDRA code), event comments, the outcome of the event, the location of the event (e.g., country where the event occurred), the event duration, patient data for a patient who endured or to which the event occurred, medical products that the patient consumed and/or dosages for the consumed medical products, the event rank, event contacts, the event type, and any associated event documents.

As used herein, the term "case" or "case dataset" can include an Individual Case Safety Report (ICSR) as defined by the standard ISO/HL7 27953 of the International Standards Organization (ISO) as well as any past or future standards governing ICSRs of the ISO, the World Health Organization (WHO), the Food and Drug Administration (FDA), the European Medicines Agency (EMA), or other national health agencies governing ICSRs. Moreover, "case information" "case data" or "case dataset" can include information associated with or included in the case such as adverse event data, case contact data, case identifier (e.g., case worldwide ID (WWID), case number, etc.), case priority data, case seriousness data, case documents, medical product data, medical product registrations, patient data, and other data associated with a case as defined by the standard ISO/HL7 27953 as well as any past or future standards governing ICSRs of the ISO, the WHO, the FDA, the EMA, or other national health agencies governing ICSRs.

Similarly, as used herein "structured data" can include data such as case data, adverse event data, medical product data, or regulatory data which is structured or arranged in a specific data structure. For instance, "structured data" may include medical product data which is structured according to a data schema (e.g., an inbound integration data schema, and outbound integration data schema, etc.). In another instance, "structured data" may include medical product labeling data which is structured according to a data schema and includes data adverse event data relating to expected adverse events of the medical product and/or strength and dosage data of the medical product. In one example, the systems and methods described herein may receive unstructured data (e.g., unstructured regulatory data, unstructured medical product data, etc.) and structure the unstructured data based on a data schema to generate structured data.

Referring now to FIG. 1, a system 100 for reconciling data differences between one or more repositories is shown, according to an example embodiment. The system 100 includes a provider computing system 104, multiple user computing devices 108, and multiple health agency computing systems 112 connected by a secure network (e.g., a network 118).

The network 118 communicably and operably couples the provider computing system 104, the user computing devices 108, and the health agency computing systems 112 such that communicable and operable computing may be provided between the provider computing system 104, the user computing devices 108, and the health agency computing systems 112 over the network 118. In various embodiments, the network 118 includes any combination of a local area network (LAN), an intranet, the Internet, or any other suitable communications network, directly or through another interface.

The provider computing system 104 may be operated and managed by a provider (e.g., a software as a service (SaaS) provider, a cloud services provider, a software provider, a service provider, etc.) and may include a computer system (e.g., one or more servers (e.g., a cloud computing server) each with one or more processing circuits). In some embodiments, the provider computing system 104 may act as a host and provide an application (e.g., a web-based application, a mobile application, etc.) to the user computing device 108 over the network 118 in response to authenticating the respective computing device. For example, the provider computing system 104 may receive authentication data (e.g., a username and corresponding password, a limited-use key, a two-factor authentication code or key, etc.) from one of the user computing devices 108. The provider computing system 104 may then authenticate the user computing device 108 based on the authentication data and provide an application to the user computing device 108 over the network 118. In some examples, the provider computing system 104 may be a multi-tenant system where various elements of hardware and software may be shared by one or more customers. In a multi-tenant system, a user is typically associated with a particular customer. In one example, a user (e.g., of the user computing device 108) could be an employee of one of a number of (pharmaceutical) companies which are tenants, or customers, of the provider computing system 104.

In some embodiments, the provider computing system 104 may run on a cloud computing platform. Users can access content on the cloud independently by using a virtual machine image or purchasing access to a service maintained by a cloud repository provider.

In some embodiments, the provider computing system 104 may be provided as Software as a Service ("SaaS") to allow users to access the provider computing system 104 with a thin client.

As shown, the provider computing system 104 may include a network interface 126, a processing circuit 128, and a shared connection repository 130. In some embodiments, the provider computing system 104 may include an input/output circuit (e.g., similar to (e.g., the same as) an input/output circuit 162 as will described further herein).

The network interface 126 is structured to establish connections with the user computing devices 108 and the health agency computing systems 112 by way of the network 118. The network interface 126 includes program logic and/or hardware-based components that connect the provider computing system 104 to the network 118. For example, the network interface 126 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver).

In some embodiments the network interface 126 may include AS2 gateway logic (not shown) that includes programmable instructions that facilitate communication (transmission and receipt) using the AS2 Gateway communication protocol (as specified in Request for Comment (RFC) 4130) over the network 118 via the network interface 126. For example, using the AS2 gateway logic, the network interface 126 may transmit or receive files (e.g., the source file, a case, etc.) or other data to the health agency computing systems 112 and/or the user computing devices 108 using the AS2 Gateway protocol.

In some embodiments, the network interface 126 may include electronic Common Technical Document (eCTD) logic (not shown) that includes programmable instructions that facilitate communication (transmission and receipt) using the eCTD protocol (as specified by the FDA in the eCTD guidance or by other health agencies) over the network 118 via the network interface 126. For example, using the eCTD logic, the network interface 126 may transmit or receive files (e.g., the source file, a case, etc.) or other data to the health agency computing systems 112 and/or the user computing devices 108 using the eCTD communication protocol.

In some embodiments, the network interface 126 includes the hardware and machine-readable media structured to support communication over multiple channels of data communication (e.g., wireless, Bluetooth, near-field communication (NFC). In some embodiments, the network interface 126 includes cryptography logic and capabilities to establish a secure communications session.

The processing circuit 128, as shown, comprises a memory 132, a processor 134, an information management circuit 136 (also referred to as a regulatory information management (RIM) circuit 136), and a case intake and management circuit 146. The memory 132 includes one or more memory devices (e.g., RAM, NVRAM, ROM, flash memory, hard disk storage, etc.) that store data and/or computer code for facilitating the various processes described herein. That is, in operation and use, the memory 132 stores at least portions of instructions and data for execution by the processor 134 to control the processing circuit 128. The memory 132 may be or include tangible, non-transient volatile memory and/or non-volatile memory. The processor 134 may be implemented as a general-purpose processor, an application specific integrated circuit (ASIC), one or more field programmable gate array (FPGAs), a digital signal processor (DSP), a group of processing components or other suitable electronic processing components.

As described herein, the information management circuit 136 is structured or configured to receive regulatory data including medical product data from one of the user computing devices 108, intake and structure the regulatory data, and generate a submission to one or more of the health agency computing systems 112. For instance, the information management circuit 136 may be a RIM circuit 136 that receives regulatory data such as medical product data; preclinical data such as data from animal studies that tested the medical product; pharmacology and toxicology studies associated with the medical product; chemistry, manufacturing and control (CMC) data including information about the medical products chemical composition as well as the manufacturing process and quality control procedures that will be used to create the medical product; clinical study data such as foreign clinical study data; and the like. The information management circuit 136 may receive the regulatory data and generate a regulatory submission based on and/or including the regulatory data. For instance, the information management circuit 136 may generate submission such as an investigational new drug application (IND) or a new drug application (NDA) and provide the submission to one of the health agency computing system 112. Then, at a later time, the information management circuit 136 may receive a registration such as a medical product registration or a clinical study registration from the respective health agency computing system 112. In one example, the information management circuit 136 may be associated with a first application (e.g., be an instance of Vault RIM®) such as a RIM application.

Additionally, the information management circuit 136 may communicate and/or interface with the case intake and management circuit 146 to set up a network connection (e.g., over the network 118) for the exchange or transmission of data. For instance, the information management circuit 136 may generate a connection data object that includes data associated with the case intake and management circuit 146 such as a network address of the case intake and management circuit 146, a certificate or private key of the case intake and management circuit 146, and the like. Then, the information management circuit 136 may communicate with the case intake and management circuit 146 via the network 118 to send and receive data such as the medical product data, the registration data, the regulatory data, and the like. As described herein, each circuit of the provider computing system 104 may be disposed across one or more servers. For instance, the information management circuit 136 may operate on a first server computing device and the case intake and management circuit 146 may operate on a second server computing device distributed across one or more locations. In this regard, each circuit of the processing circuit 128 may be a separate instance of a Virtual Private Clouds (VPC), thereby providing a certain level of isolation between the information management circuit 136 and the case intake and management circuit 146 using the resources (e.g., the memory 136 and the processor 140). For instance, the provider computing system 104 may include multiple information management circuit 136 and multiple case intake and management circuits 146.

As shown, the information management circuit 136 may include a submission processing circuit 138, a data integration management circuit 140, a medical product repository 142, and a connection repository 144. In some embodiments, the information management circuit 136 may include a certificate or key repository (not shown) for storing a certificate or key (pair). The submission processing circuit 138 may be configured or structured to receive the regulatory data from one or more of the user computing devices 108 and store the regulatory data in the medical product repository 142. In other embodiments, the information management circuit 136 may include additional repositories, and the submission processing circuit 138 may store a portion of the regulatory data in the medical product repository 142 and other regulatory data in the additional repositories. Further, the submission processing circuit 138 may generate a submission such as an eCTD XML file including one or more portions of the regulatory data. For instance, the submission processing circuit 138 may generate an IND as an eCTD XML file including the one or more portions of the regulatory data. Then, via the network interface 126, the submission processing circuit 138 may submit or transmit the eCTD XML file to the respective health agency computing device(s) 112. In some embodiments, in response, the submission processing circuit 138 may receive a medical product or study registration from the health agency computing device(s) 112. For instance, in response to the IND, the submission processing circuit 138 may receive an IND approval letter including an IND number, a medical product name, approval conditions, clinical trial requirements, reporting and monitoring obligations, and the like. Then, the submission processing circuit 138 may generate a clinical study registration (data object) including at least a portion of the data included in the IND approval letter.

In some embodiments, the integration management circuit 136 may receive unstructured data and may structure the data according to a RIM medical product data schema. An example of the RIM medical product data schema is shown below:

```
organization__v: Object (RIM Organization)          {
        last_modified_date__v: DateTime;
        country__v: Text;
        organization_uid_code__v: Text;
        name__v: Text;
        deleted_in_rim__v: Bool;
        product_family__v: Child Object(RIM Product-Family)      {
                last_modified_date__v: DateTime;
                name__v: Text;
                trade_name__v: Text
                generic_name__v: Text;
                deleted_in_rim__v: Bool;
                product__v: Child Object(RIM Product)      {
                        last_modified_date__v: DateTime;
                        name__v: Text;
                        trade_name__v: Text;
                        product_type__v: Picklist;
                        international_birthdate__v: text;
                        deleted_in_rim__v: Bool;
                        product_variant__v: Child Object(RIM Product Variant)   {
                                last_modified_date__v: DateTime;
                                name__v: Text;
                                product_strength__v: Text;
                                deleted_in_rim__v: Bool;
                                drug_substance__v: Child Object(RIM Drug Substance)
{
                                        last_modified_date__v: DateTime;
                                        name__v: Text;
                                        identifier__v; Text;
                                        ev_code__v; Text;
                                        spor_substance_code__v; Text;
                                        us_substance_code__v; Text
```

-continued

```
                    cas_number__v; Text
                    ec_number_code__v; Text
                    deleted_in_rim__v: Bool;
                    product_registration__v: Child Object(RIM
Product Registration) { last_modified_date__v: DateTime;
                        name__v: Text;
                        country__v: Text;
                        registration_start_date__v: Date;
                        registration_end_date__v: Date;
                        registration_holder__v: Text;
                        deleted_in_rim__v: Bool;   }}}}}}
```

As shown, the RIM medical product data schema may be hierarchical such that each data object includes a child (also referred to as dependent) data object until reaching the lowest level (e.g., the product registration level). For example, the RIM medical product data schema may start with a highest or top-level (e.g., the organization level) which may include a lower-level child data object that depends on the highest-level data object. In some embodiments, there may be 6-levels to the RIM medical product data schema: a first or highest-level (the organization data object), a second-level (the product family data object), a third-level (the product data object), a fourth-level (the product variant data object), a fifth-level (the substance data object), and a sixth-level (the product registration data object). In this regard, the organization data object may include one or more child product family data objects; which each may include one or more product data objects; and so on until reaching the product registration data object. The data objects may be dependent or child data objects in that they cannot exist or be created without the parent data object. For instance, a product family data object cannot be created without a parent organization data object. In this regard, the integration management circuit 136 may receive unstructured data (e.g., unstructured medical product data) and structure or arrange the unstructured medical product data according to the RIM medical product data schema to generate (hierarchically) structured data.

The data integration management circuit 140 may be configured or structured to initiate data integration or communication with the case intake and management circuit 146 over the network 116 and then transmit and/or provide data to the case intake and management circuit 146. For instance, the data integration management circuit 140 may generate a data connection or integration data object which represents or includes data representing an application programming interface (API) integration between the information management circuit 136 and the case intake and management circuit 146. For instance, the data integration management circuit 140 may generate a connection data object. Then, the data integration management circuit 140 may receive or exchange a certificate with the case intake and management circuit 146. The certificate (e.g., a public key signed with a signature) may be used to authenticate the data integration management circuit 140 when communicating with the case intake and management circuit 146 and to encrypt or decrypt communications.

For instance, a message or data sender (e.g., the data integration management circuit 140) typically signs the composed message using their private (i.e., not publicly known) key. The receiver of the message or data (e.g., the case intake and management circuit 146) can then use the publicly-known public key of the sender to verify this signature, to ensure that it actually came from the sender.

Further, the sender may encrypt the signed message using the message receiver's publicly-known public key. Only the receiver can decrypt this content, using their corresponding secret private key. Further, the message receiver may similarly sign (transform via hashing) a Message Disposition Notification (MDN) receipt using their private key. Again, the sender can use the publicly-known public key of the receiver to verify this signature, to ensure that the MDN actually came from the receiver, and also indirectly confirm that the original message was actually received by the receiver. In this regard, a certificate contains the public key of some party (usually identified by a distinguished name (DN)), along with a signature made using the private key of a "trusted" certificate authority (CA) or the key-owner itself.

In some embodiments, the data integration management circuit 140 may generate an integration or connection data object (also referred to an API data object) that is structured according to an information management-safety (also referred to as an outbound integration) data schema. An example of the information management-safety data schema is shown below:

```
(safety_rim_connection_v): {
    safety_rim_connection_status_v: Bool;
    safety_certificate_v: Object(Safety Certificate);
    rs_product_integration_v: Object(RIM-Safety: Product
        Integration) {
        rs_product_integration_v: Bool;
        rs_organization_out_v:  Object(RIM-Safety  Out-
            bound: Organization) {
            organization_status_v: Bool; }
        rs_product_family_out_v: Object(RIM-Safety Out-
            bound: Product Family) {
            product_family_status_v: Bool; }
        rs_product_out_v:  Object(RIM-Safety  Outbound:
            Product) {
            product_status_v: Bool; }
        rs_product_variant_out_v: Object(RIM-Safety Out-
            bound: Product Variant) {
            product_variant_status_v: Bool; }
        rs_substance_out_v: Object(RIM-Safety Outbound:
            Substance) {
            rs_substance_status_v: Bool; }
        rs_product_registration_out_v:  Object(RIM-Safety
            Outbound: Product Registration) {
            product_registration_status_v: Bool; }}}
```

As shown, the connection data object (e.g., safety_rim_connection_v) may include multiple child data objects that are used for the management and output of notifications or messages to the case intake and management circuit 146. For instance, the connection data object includes one or more child (also referred to as dependent) data objects such as the product integration data object (rs_product_integration) which may provide for an intermediary in the generation and transfer of messages or notifications between the information management circuit 136 and the case intake and management circuit 146. For instance, the product integration data object is shown to include multiple child data objects including the outbound organization data object, the outbound product family data object, the outbound product data object, and the like. In this regard, each of the data objects including the term "out" may be referred to as "outbound data objects." Further, in response to receiving a change to the corresponding structured data (e.g., an organization data object for the outbound organization data object, a product registration data object for the outbound product registration data object, etc.), the information management circuit 136 may generate the outbound data object which may include or be populated with a message or notification to the case intake and management circuit 146. For instance, the information management circuit 136 may receive new structured data (e.g., an organization data object) and generate the respective outbound data object (e.g., an outbound organization data object). Further, the information management circuit 136 may generate a message or notification and populate the outbound organization data object with the message or notification.

The data integration management circuit 140 may generate a data object when the respective structured medical product data is created, received, or modified within the medical product repository 142. For instance, the medical product repository 142 may receive organization data representing a new organization therein. Accordingly, the data integration management circuit 140 may receive an indication of such and generate a new outbound organization data object, and populate the outbound organization data object with a message or notification indicating new structured data was received. In some embodiments, the message may include a country, an organization UID, and/or a name of the organization. Accordingly, the data integration management circuit 140 may populate the organization data object of the outbound organization data object with a message or notification including the country (e.g., in the country field), the organization UID (e.g., in the organization UID field), and the name (e.g., in the name field). In some embodiments, the data integration management circuit 140 may populate the respective outbound data object with a reference pointer to the corresponding structured data (e.g., a reference pointer to an organization data object in the outbound organization data object). The data integration management circuit 140 may then add the generated data objects to the connection repository 144. In some embodiments, in response to generating an outbound data object, the information management circuit 136 and/or the data integration management circuit 140 may provide the outbound data object to the case intake and management circuit 146.

The medical product repository 142 may be repository (e.g., a database) that is structured or configured to receive, store, and manage the structured medical product data of medical products through interaction with the submission processing circuit 138. For example, the submission processing circuit 138 may receive regulatory data from the user computing devices 108 to prepare submissions to the health agency computing systems 112. The regulatory data may include medical product data such as an organization or client that owns the medical product, a substance or chemical formula of the medical product, a dosage of the medical product, a type of the medical product, and the like. The medical product repository 142 may receive the medical product data and store the medical product data therein. In some embodiments, in response to receiving medical product data, the medical product repository 142 may provide an indication or a message to the data integration management circuit 140. In some embodiments, the medical product repository 142 may receive the medical product data as a part of one or more data objects. For instance, the medical product repository 142 may receive an organization data object, a product data object, a product family data object, a substance data object, or a product registration data object, and the medical product data may be included in the respective data object. In this regard, the medical product repository 142 may store the data objects therein. To do so, the medical product repository 142 can be structured according to various database types, such as, relational, hierarchical, network, flat, point-in time, and/or object relational. In some embodiments, the medical product repository 142 includes a plurality of nonvolatile/non-transitory storage media such as solid-state storage media, hard disk storage media, virtual storage media, cloud-based storage drives, storage servers, and/or the like. In some embodiments, the provider computing system 104 may include a medical product repository 142 for each customer or sponsor, thereby keeping the medical product data of each customer separate.

Similarly, the connection repository 144 may be repository (e.g., a database) that is structured or configured to receive, store, and manage connection data and connection data objects through interaction with the data integration management circuit 140. For example, the data integration management circuit 140 may receive an indication or notification medical product data was modified or received in the medical product repository 142 and generate one or more outbound connection data objects including a message or notification therein. The connection repository 144 may receive the connection data object(s) and store the data object(s) therein. To do so, the connection repository 144 can be structured according to various database types, such as, relational, hierarchical, network, flat, point-in time, and/or object relational. In some embodiments, the connection repository 144 includes a plurality of nonvolatile/non-transitory storage media such as solid-state storage media, hard disk storage media, virtual storage media, cloud-based storage drives, storage servers, and/or the like. In some embodiments, the provider computing system 104 may include a connection repository 144 for each customer or sponsor, thereby keeping the connection data and data objects of each customer separate.

As described herein, the case intake and management circuit 146 is structured or configured to receive, generate, store, and manage case datasets. For instance, the case intake and management circuit 146 may be configured or structured to receive medical product data and store the medical product data in the medical product repository 152. The case intake and management circuit 146 may then receive or retrieve adverse event data associated with an adverse event from a trusted source (one of the user computing devices 108, one of the health agency computing systems 112, etc.). Further, the case intake and management circuit 146 may match the adverse event data with medical product data of a medical product repository 152, generate a case dataset including case data, and store the case dataset within a case repository (not shown). In one example, the case intake and management circuit 146 may be associated with a second application (e.g., be an instance of Vault Safety®) such as a pharmacovigilance case processing and reporting application. As shown, the case intake and management circuit 146 includes the case intake circuit 146, the data integration management circuit 150, the medical product repository 152, and the connection repository 154.

The case intake circuit 148 is configured or structured to receive adverse event data, match the adverse event data with the medical product data, and generate a case dataset including at least a portion of the adverse event data and the medical product data. For instance, the case intake circuit 148 may receive a source file including adverse event data associated with an adverse event (e.g., heart attack) and a medical product (e.g., drug x). Accordingly, the case intake circuit 148 may search the medical product repository 152 for a medical product that matches the medical product of the adverse event data and return the matching medical product data (e.g., a registration for drug x, a UID of drug x, one or more substance(s) included in drug x, etc.). The case intake circuit 148 may then generate a case dataset including at least a portion of the adverse event data and the medical product data. Further, the case intake circuit 148 may then generate an electronic submission package and output at least a portion of the case dataset in the electronic submission package to one of the health agency computing systems 112 or the user computing devices 108. In this regard, the case intake circuit 148 may provide for the intake, processing, and submission of case datasets to health authorities.

In some embodiments, the case intake circuit 148 may receive unstructured data and may structure the data according to a safety medical product data schema. In other embodiments, the case intake circuit 148 may receive structured data from the information management circuit 136 and may modify the structured data to structure the data according to the safety medical product data schema. For instance, the case intake circuit 148 may receive structured data and may map each field of the structured data to a field of the safety medical product data schema, therefore modifying the structure of the structured data.

While not shown, the safety medical product data schema may be similar or the same as the RIM medical product data schema with a couple of exceptions. For instance, the safety medical product data schema may include each of the hierarchical levels of the RIM medical product schema.

Additionally, the safety medical product data schema may be hierarchical such that each data object includes a child (also referred to as dependent) data object until reaching the lowest level (e.g., the product registration level). For example, the safety medical product data schema may start with a highest or top-level (e.g., the organization level) which may include a lower-level child data object that depends on the highest-level data object. In some embodiments, there may be 6-levels to the safety medical product data schema: a first or highest-level (the organization data object), a second-level (the product family data object), a third-level (the product data object), a fourth-level (the product variant data object), a fifth-level (the substance data object), and a sixth-level (the product registration data object). In this regard, the organization data object may include one or more child product family data objects; which each may include one or more product data objects; and so on until reaching the product registration data object. The data objects may be dependent or child data objects in that they cannot exist or be created without the parent data object. For instance, a product family data object cannot be created without a parent organization data object. In this regard, the case intake and management circuit 146 may receive structured data and modify the structured data to structure or arrange the structured medical product data according to the safety medical product data schema to generate (hierarchically) structured data.

The data integration and management circuit 150 may be similar to the data integration and management circuit 140 may be configured or structured to initiate data integration or communication with the information management circuit 128 over the network 116 and then receive or request data from the information management circuit 136. For instance, the data integration management circuit 150 may generate a data connection or integration data object which represents or includes data representing an application programming interface (API) integration between the case intake and management circuit 146 and the information management circuit 136. For instance, the data integration management circuit 150 may generate a connection data object. Then, the data integration management circuit 150 may receive or exchange a private key or certificate with the information management circuit 136. The certificate (e.g., a public key signed with a signature), or private key may be used to authenticate the data integration management circuit 150 when communicating with the information management circuit 136 and to encrypt or decrypt communications.

In some embodiments, the data integration management circuit 150 may generate an integration or connection data object (also referred to an API data object) that is structured according to a safety-information management (also referred to as an inbound integration) data schema. An example of the safety-information management data schema is shown below:

```
(safety_to_rim_v): {
    safety_to_rim_status_v: Bool;
    rim_certificate_v: Object(RIM Certificate);
    rs_product_integration_v: Object(RIM-Safety: Product
        Integration) {
        rs_product_integration_status_v: Bool;
        rs_organization_in_v: Object(RIM-Safety Inbound:
            Organization) {
            organization_last_modified_date_v: DateTime;
            organization_status_v: Bool; }
        rs_product_family_in_v:          Object(RIM-Safety
            Inbound: Product Family)
    {
        product_family_last_modified_date_v: DateTime;
        product_family_status_v: Bool; }
    rs_product_in_v: Object(RIM-Safety Inbound: Prod-
    uct) {
        product_last_modified_date_v: DateTime;
        product_v: Object(Safety Product) {
        product_status_v: Bool; }
    rs_product_variant_in_v: Object(RIM-Safety Inbound:
    Product Variant)
    {
        product_variant_last_modified_date_v: DateTime;
        product_variant_status_v: Bool; }
    rs_substance_in_v: Object(RIM-Safety Inbound: Sub-
    stance) {
        substance_last_modified_date_v: DateTime;
        rs_substance_status_v: Bool; }
    rs_product_registration_in_v:          Object(RIM-Safety
    Inbound: Product
    Registration) {
        product_registration_last_modified_date_v: DateTime;
        product_registration_status_v: Bool; }}}
```

As shown, the connection data object (e.g., safety_to_rim_v) may include multiple child data objects that are used for the management and receipt of notifications or messages and determining if new data has been received by the information management circuit 136. For instance, the connection data object includes one or more child (also referred to as dependent) data objects such as the product integration data object (rs_product_integration) which may provide for an intermediary in the transfer of messages and notifications between the information management circuit 136 and the case intake and management circuit 146. For instance, the product integration data object is shown to include multiple child data objects including the inbound organization data object, the inbound product family data object, the inbound product data object, and the like. In this regard, each of the data objects including the term "in" may be referred to as "inbound data objects." Further, based on the inbound integration data schema, each of these data objects may include one or more child data objects as well as one or more fields for storing values therein. For instance, the inbound organization data object may include a last modified date/time and/or a pointer to the received organization data object. In some embodiments, each inbound organization data object may further include a deleted field or flag (not shown) which identifies if the respective data was deleted in the information management circuit 136.

The data integration management circuit 150 may generate a data object in response to the data integration management circuit 140 generating data object and/or in response to receiving one or more outbound data objects from the case intake and management circuit 146 (via the network 118). For instance, the data integration management circuit 140 may generate a new outbound organization data object, and populate the outbound organization data object with a generated message or notification. The case intake and management circuit 146 and/or the data integration management circuit 140 may then provide the outbound organization data object to the shared connection repository 130 or the data integration management circuit 150 via the network 118. The data integration management circuit 150 may receive the message or notification or determine the shared connection repository 130 includes a new outbound data object, and generate an inbound data object which includes the data of the outbound data object (e.g., the organization data object) or a reference pointer to the outbound organization data object. Accordingly, the data integration management circuit 150 may populate the organization data object of the inbound organization data object with the country (e.g., in the country field), the organization UID (e.g., in the organization UID field), and the name (e.g., in the name field), and the other data of the outbound organization data object as well as set the deleted field to false (as will described further herein). The data integration management circuit 150 may then add the generated data objects to the connection repository 154. In some embodiments, the data integration management circuit 150 may then query/select or receive data from the medical product repository 142 of the information management circuit 136. For instance, the data integration management circuit 150 may receive the outbound data object including the notification or message and query the medical product repository 142 for structured data in response.

The medical product repository 152 may be a repository (e.g., a database) that is structured or configured to receive, store, and manage medical product data of medical products through interaction with the data integration management circuit 150. For example, the data integration management circuit 150 may receive medical product data from the information management circuit 136. The medical product repository 152 may receive the medical product data and store the medical product data therein. In some embodiments, the medical product repository 152 may receive the medical product data as a part of one or more data objects. For instance, the medical product repository 152 may receive an organization data object, a product data object, a product family data object, a substance data object, or a product registration data object, and the medical product data may be included in the respective data object. In this regard, the medical product repository 152 may store the data objects therein. To do so, the medical product repository 152 can be structured according to various database types, such as, relational, hierarchical, network, flat, point-in time, and/or object relational. In some embodiments, the medical product repository 152 includes a plurality of nonvolatile/non-transitory storage media such as solid-state storage media, hard disk storage media, virtual storage media, cloud-based storage drives, storage servers, and/or the like. In some embodiments, the provider computing system 104 may include a medical product repository 152 for each customer or sponsor, thereby keeping the medical product data of each customer separate.

Similarly, the connection repository 154 may be a repository (e.g., a database) that is structured or configured to receive, store, and manage connection data and connection data objects through interaction with the data integration management circuit 150. For example, the data integration management circuit 150 may receive a message or notification from the information management circuit 136 and generate one or more inbound connection data objects including the data therein. The connection repository 154 may receive the inbound connection data object(s) and store the data object(s) therein. To do so, the connection repository 154 can be structured according to various database types, such as, relational, hierarchical, network, flat, point-in time, and/or object relational. In some embodiments, the connection repository 154 includes a plurality of nonvolatile/non-transitory storage media such as solid-state storage media, hard disk storage media, virtual storage media, cloud-based storage drives, storage servers, and/or the like. In some embodiments, the provider computing system 104 may include a connection repository 154 for each customer or sponsor, thereby keeping the connection data and data objects of each customer separate.

The shared connection repository 130 may be a shared repository (e.g., a database, cloud storage (e.g., Amazon S3 storage)) that is structured or configured to receive, store, and manage connection data and connection data objects through interaction with the data integration management circuit 140 and the data integration management circuit 150. For example, the shared connection repository may receive outbound data objects from the data integration management circuit 140 and store the outbound data objects therein. In some embodiments, the shared connection repository 130 may further provide a notification or indication indicating a new outbound data object has been stored to the data integration management circuit 150. Further, the data integration management circuit 150 may then request the outbound data objects, and the shared connection repository 130 may provide them in response. To do so, the shared connection repository 130 can be structured according to various database types, such as, relational, hierarchical, network, flat, point-in time, and/or object relational. In some embodiments, the shared connection repository 130 includes a plurality of nonvolatile/non-transitory storage media such as solid-state storage media, hard disk storage media, virtual storage media, cloud-based storage drives, storage servers, and/or the like. In some embodiments, the shared connection repository 130 may be external to the provider computing system 104. For instance, the shared connection repository 130 may receive and provide outbound data objects, via the network 118.

Still referring to FIG. 1, the user computing devices 108 can each be any type of computing device or computing system. For instance, each user computing device 108 can be one or more of a mobile phone, a tablet computer, a laptop computer, a smart watch, a server computer system, or any other internet-connected device. In operation, the user computing devices 108 may communicate and interface with the provider computing system 104 via the network 118 to provide regulatory data to the information management circuit 136 or source files including adverse event data to the case intake and management circuit 146. As shown, each user computing device 108 may include a network interface 156, a processing circuit 160, and the input/output (I/O) circuit 162.

The network interface 156 is structured to establish connections with the provider computing system 104 by way of the network 118. The network interface 156 includes program logic and/or hardware-based components that connect the user computing device 108 to the network 118. For example, the network interface 156 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 156 includes the hardware and machine-readable media structured to support communication over multiple channels of data communication (e.g., wireless, Bluetooth, near-field communication (NFC). In some embodiments, the network interface 156 includes cryptography logic and capabilities to establish a secure communications session.

The processing circuit 160, as shown, comprises a memory 168 and a processor 170. The memory 168 includes one or more memory devices (e.g., RAM, NVRAM, ROM, flash memory, hard disk storage, etc.) that store data and/or computer code for facilitating the various processes described herein. That is, in operation and use, the memory 168 stores at least portions of instructions and data for execution by the processor 170 to control the processing circuit 160. The memory 168 may be or include tangible, non-transient volatile memory and/or non-volatile memory. The processor 170 may be implemented as a general-purpose processor, an application specific integrated circuit (ASIC), one or more field programmable gate array (FPGAs), a digital signal processor (DSP), a group of processing components or other suitable electronic processing components.

The I/O circuit 162 is structured to receive communications from and provide communications to the user of the user computing device 108 (e.g., the user). In this regard, the I/O circuit 162 is structured to exchange data with the processing circuit 160 to provide output to the user and to receive input from the user. As a result, the I/O circuit 162 may include a display that may be manipulated by the application. In some embodiments, the I/O circuit 162 may also include a keyboard, a mouse, a joystick, a touch screen, touch areas, soft keys, a microphone, a speaker, a vibration mechanism, a sensor, a RFID scanner, or other input/output devices described herein.

Still referring to FIG. 1, the health agency or authority computing systems 112 can include any type of computing device or computing system and may be associated or managed by a health agency (e.g., the FDA, the EMA, Health Canada, etc.). For instance, at least one of the health agency computing systems 112 may be the Electronics Submission Gateway (ESG) of the FDA through which one or more E2B XML files and/or an FDA 3500A PDF files (e.g., case datasets) may be received from or provided to. In operation, each health agency computing system 112 may communicate with the provider computing system 104 or the user computing devices 108 to send and/or receive one or more case datasets associated with adverse events (e.g., E2B files). Further, the health agency computing system 112 may include a network interface 176, a processing circuit 178, and the input/output (I/O) circuit 184.

The network interface 176 is structured to establish connections with the provider computing system 104 by way of the network 118. The network interface 176 includes program logic and/or hardware-based components that connect the user computing device 108 to the network 118. For example, the network interface 176 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 176 includes the hardware and machine-readable media structured to support communication over multiple channels of data communication (e.g., wireless, Bluetooth, near-field communication (NFC). In some embodiments, the network interface 176 includes cryptography logic and capabilities to establish a secure communications session.

In some embodiments the network interface 176 may include AS2 gateway logic (not shown) that includes programmable instructions that facilitate communication (transmission and receipt) using the AS2 Gateway communication protocol (as specified in Request for Comment (RFC) 4130) over the network 118 via the network interface 176. For example, using the AS2 gateway logic, the network interface 176 may transmit or receive files (e.g., the source file, a case, etc.) or other data from the provider computing system 104 using the AS2 Gateway protocol.

The processing circuit 178, as shown, comprises a memory 180 and a processor 182. The memory 182 includes one or more memory devices (e.g., RAM, NVRAM, ROM, flash memory, hard disk storage, etc.) that store data and/or computer code for facilitating the various processes described herein. That is, in operation and use, the memory 180 stores at least portions of instructions and data for execution by the processor 182 to control the processing circuit 178. The memory 180 may be or include tangible, non-transient volatile memory and/or non-volatile memory. The processor 182 may be implemented as a general-purpose processor, an application specific integrated circuit (ASIC), one or more field programmable gate array (FPGAs), a digital signal processor (DSP), a group of processing components or other suitable electronic processing components.

The I/O circuit 184 is structured to receive communications from and provide communications to the user of the health agency computing system 112 (e.g., the health agency user). In this regard, the I/O circuit 184 is structured to exchange data with the processing circuit 178 to provide output to the user and to receive input from the health agency user. As a result, the I/O circuit 180 may include a display that may be manipulated by the application. In some embodiments, the I/O circuit 180 may also include a keyboard, a mouse, a joystick, a touch screen, touch areas, soft keys, a microphone, a speaker, a vibration mechanism, a sensor, a RFID scanner, or other input/output devices described herein.

Referring now to FIG. 2, a method 200 of initiating a network connection between a first repository and a second repository, according to an example embodiment. Method 200 can be carried out by the system of FIG. 1. More particularly, the method 200 can be carried out by the processing circuit 128 of the provider computing system 104 and through communication with the user computing devices 108 and the health agency computing systems 112.

Method 200 commences at step 204 at which the provider computing system 104 receives a request to generate a network connection or integration between a first data repository (e.g., the first medical product repository 142) and a second data repository (e.g., the second medical product repository 152). In this regard, the request may identify the first repository and the second repository. In some embodiments, the request may be to generate a connection between a first circuit or VPC (e.g., the information management circuit 136) and a second circuit or VPC (e.g., the case intake and management circuit 148). In this regard, the request may identify the first circuit or VPC and the second circuit or VPC. In some embodiments, the request may be received from one of the user computing devices 108 via the network 118. In some embodiments, the provider computing system 104 may receive two requests (e.g., a first request to the first circuit or repository and a second request to the second circuit or repository). In other embodiments, the provider computing system 104 may disseminate or provide the request to each of the circuits or repositories identified in the request.

Once the provider computing system 104 has received the request to generate a network connection, the method 200 proceeds to step 208 at which the provider computing system 104 and more specifically the first repository or circuit (e.g., the information management circuit 136) generates a first connection data object. The first connection data object may be structured according to the outbound or inbound integration data schema described herein, and may represent an API integration point between the first repository or circuit and the second repository or circuit. In this regard, the first connection data object may be generated to include a status (e.g., safety_rim_connection_status_v) of "false" or "0" indicating the connection is not currently active. In some embodiments, once the provider computing system 104 and more specifically the first repository or circuit (e.g., the information management circuit 136) has generated the first connection data object, the first repository or circuit (e.g., the information management circuit 136) may store the connection data object in the connection repository 144.

Once the provider computing system 104 has generated the first connection data object, the method 200 proceeds to step 212 at which the provider computing system 104 and more specifically the second repository or circuit (e.g., the case intake and management circuit 146) generates a second connection data object. The second connection data object may be structured according to the outbound or inbound integration data schema described herein, and may represent an API integration point between the second repository or circuit and the first repository or circuit. In this regard, the second connection data object may be generated to include a status (e.g., safety_to_rim_status_v) of "false" or "0" indicating the connection is not currently active. In some embodiments, once the provider computing system 104 and more specifically the second repository or circuit (e.g., the case intake and management circuit 146) has generated the second connection data object, the second repository or circuit (e.g., the information management circuit 136) may store the connection data object in the connection repository 154.

Once the provider computing system 104 has generated the second connection data object, the method 200 proceeds to step 212 at which the provider computing system 104 and more specifically the first repository or circuit (e.g., the information management circuit 136) modifies the first connection data object to activate the first connection data object. For instance, the first circuit (e.g., the information management circuit 136) may select the first connection data object from the connection repository 144 and update or modify the status to "true" or "1" indicating the connection is active. In some embodiments, before step 212, the first circuit (e.g., the information management circuit 136) and the second circuit (e.g., the case intake and management circuit 146) may exchange certificates such that the first circuit may provide a first certificate to the second circuit, and the second circuit may provide a second certificate to the first circuit. For instance, prior to step 212, the first circuit may provide or transmit a first certificate to the second circuit. The second circuit may store the first certificate therein (e.g., in a key repository (not shown)). Likewise, prior to step 212, the second circuit may provide or transmit a second certificate to the first circuit. The first circuit may store the second certificate therein (e.g., in a key repository (not shown)). In some embodiments, the certificate exchange may occur in response to receiving the request to generate a network connection.

In some embodiments, to modify the first connection data object to activate the first connection data object, the first circuit may generate a child certificate data object of the first connection data object and populate the certificate data object with the second certificate received from the second circuit and/or update or modify the status to "true" or "1" indicating the connection is active. As described herein, the certificates may be used to encrypt data communications between the first circuit and the second circuit. As a result, prior to the certificate exchange, the first circuit may not be able to properly encrypt any data communications such that only the second circuit can decrypt them. In this regard, the data connection and the connection data objects may not be considered "active" until the certificate exchange takes place, and the connection data object includes the certificate of the respective circuit.

Once the provider computing system 104 modifies the first connection data object to activate the first connection data object, the method 200 proceeds to step 216 at which the provider computing system 104 and more specifically the second circuit (e.g., the case intake and management circuit 146) modifies the second connection data object to activate the second connection data object. For instance, the second circuit may select the second connection data object from the connection repository 154 and update or modify the status to "true" or "1" indicating the connection is active. In some embodiments, to modify the second connection data object to activate the second connection data object, the second circuit may generate a child certificate data object of the second connection data object and populate the certificate data object with the first certificate received from the first circuit and/or update or modify the status to "true" or "1" indicating the connection is active.

Figure 3:
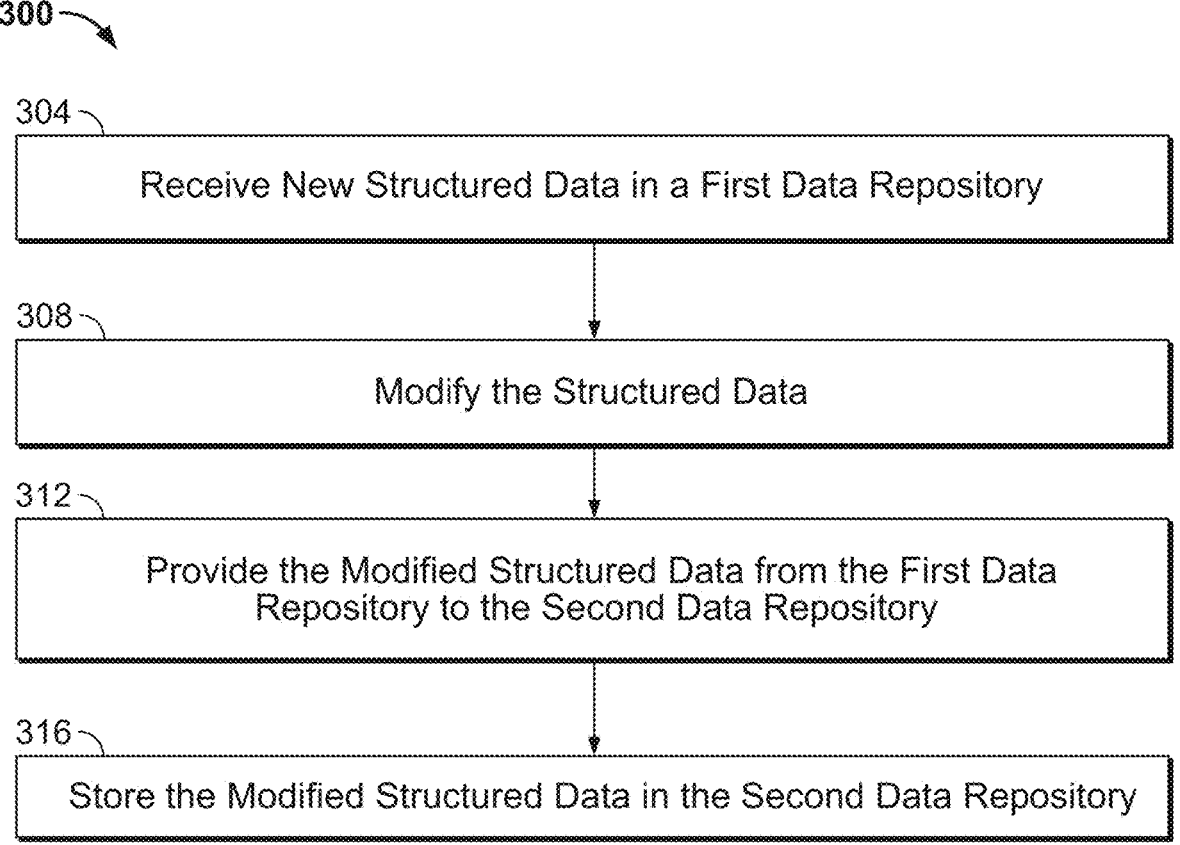
FIG. 3 may be a flow diagram of a method for reconciling the receipt of new structured data in a first repository within a second repository, according to an example embodiment.

Referring now to FIG. 3, a method 300 of reconciling the receipt of new structured data in a first repository within a second repository, according to an example embodiment. Method 300 can be carried out by the system of FIG. 1. More particularly, the method 300 can be carried out by the processing circuit 128 of the provider computing system 104 and through communication with the user computing devices 108 and the health agency computing systems 112.

Method 300 commences at step 304 at which the provider computing system 104 receives new structured data in a first data repository (e.g., the medical product repository 142). For instance, as described herein, the information management circuit 136 may receive regulatory data including medical product data from one of the user computing devices 108 and/or the health agency computing systems 112. In some embodiments, the medical product may be unstructured and the information management circuit 136 may structure the medical product data based on the RIM medical product data schema to generate structured data. Then, the information management circuit 136 may store the structured medical product data in the medical product repository 142. For instance, the information management circuit 136 may receive unstructured medical product data such as a text name of the medical product, a text trade name (e.g., a trade name used to identify the medical product), a text value of the strength or dosage of the medical product, a text value of a substance or active ingredient of the medical product. Then, the information management circuit 136 may generate a medical product data object based on the RIM medical product schema and structure the unstructured medical product data by adding the unstructured medical product data to the medical product data object (e.g., the name to a name field, the dosage to a dosage field, the substance to a child substance data object, etc.). Then, the information management circuit 136 may store the structured medical product data (e.g., the medical product data object) in the medical product repository 142.

In some embodiments, prior to step 304, the provider computing system 104 (and more particularly the information management circuit 136) may receive unstructured data such as unstructured medical product data. For instance, the provider computing system 104 may receive unstructured medical product data from the user computing device 108. Then, the provider computing system 104 (and more particularly the information management circuit 136) may generate structured data based on the unstructured data by arranging or adding the unstructured data to a RIM medical product data schema. Then, the provider computing system 104 may add the structured data to the medical product repository 142.

Once the first repository has received the new structured data, the method 300 proceeds to step 308 at which the provider computing system 104 (or more specifically the information management circuit 136) modifies the structured data. For instance, the information management circuit 136 may modify the structure data by encrypting the structured data. In some embodiments, the provider computing system 104 may not proceed to step 308 unless the connection data object of the connection repository 144 is active. For instance, if before step 308, the provider computing system 104 determines the connection data object is not active, the method 300 may end. Likewise, if the connection data object is active, the method 300 may proceed to step 308 and the provider computing system 104 (and more specifically the information management circuit 136) may modify the structured data by encrypting the structured data. For instance, the information management circuit 136 may retrieve the certificate of the corresponding second circuit (e.g., the case intake and management circuit 146) and encrypt the structured data based on the certificate (e.g., based on a public key of the certificate). For instance, the certificate may include the public key of the corresponding second circuit, which may be used to encrypt the data based on an encryption algorithm. For instance, the provider computing system 104 may utilize an asymmetric encryption algorithm which utilizes a private-public key pair for decryption and encryption such as the Rivest-Shamir-Adleman (RSA) encryption algorithm, the Elliptic Curve Cryptography (ECC) encryption algorithm, or other encryption algorithms.

In some embodiments, before or after step 308, the provider computing system 104 (and more specifically the information management circuit 136) may generate an outbound data object including a message or notification indicating new data was received by the first repository. For instance, the information management circuit 136 may receive new structured data including an organization data object and store it in the medical product repository 142. Then, the information management circuit 136 may generate an outbound organization data object (e.g., as a child data object of the connection data object) including a message or notification that new structured data was received and provide it to the case intake and management circuit 146.

Once the provider computing system 104 has modified the structured data, the method 300 proceeds to step 312 at which the provider computing system 104 provides or transmits the modified structured data from the first data repository (e.g., the connection repository 144) to a second data repository 130 (e.g., the shared connection repository 130, the connection repository 154, etc.). For instance, at step 312, the information management circuit 136 may transmit or provide the modified structured data, over the network 118, to the connection repository 154. In some embodiments, the information management circuit 136 may directly provide the modified structured data to the case intake and management circuit 146 to reconcile the differences in structured data between the two circuits.

In some embodiments, at step 312, to provide the modified structured data from the first repository to the second repository, the second circuit (e.g., the case intake and management circuit 146) may request or select the modified structured data from the first circuit or repository. For instance, the case intake and management circuit 146 may receive an indication or notification (e.g., as part of the outbound data object) that the new structured data was received by the medical product repository 142. Then, in response, the case intake and management circuit 146 may receive or request the new (modified) structured data from the information management circuit or the medical product repository 142. Further, in response to receiving the modified structured data from the first circuit, the second circuit may generate the corresponding inbound data object and populate the inbound data object with the date and time the modified structured data was received and then store the inbound data object therein (e.g., in the connection repository 154).

In some embodiments, the provider computing system 104 (and more specifically the case intake and management circuit 146) may proceed through an ordered intake of the structured data based on the hierarchy of the safety medical product data schema. For instance, the organization data object may include a dependent medical product family data object. Similarly, the medical product family data object may include a dependent inbound medical product data object, and so on until reaching the product registration data object. Accordingly, when receiving or selecting new structured data, the provider computing system (and more specifically the case intake and management circuit 146) may retrieve the structured data in order by selecting or retrieving first structured data (e.g., an organizational data object) having a first hierarchical level in the safety medical product data schema, then selecting or retrieving second structured data (e.g., a medical product family data object) having a second hierarchical level which depends on the first level, and so on, until reaching the lowest-level structured data.

By using an order to intake the structured data, the provider computing system 104 ensures that the structured data stored in the medical product repository 152 will not have any empty or missing dependencies (e.g., reference pointers that do not point to a data object). For instance, if the provider computing system 104 were to intake the medical product family data object prior to intaking the organization data object, the medical product family data object would have no parent organization data object to point to (because the organization data object was not yet created), which results in a missing or empty dependency.

In some embodiments, after step 312 (e.g., the case intake and management circuit 146 receives the modified structured data), the case intake and management circuit 146 may modify the structured data once again. For instance, the case intake and management circuit 146 may decrypt the modified structured data based on a private key stored in a key repository (not shown) which corresponds with the public key of the certificate which was used to encrypt the structured data. In some embodiments, the case intake and management circuit 146 may further modify the structured data based on a specific schema of the medical product repository 152 (e.g., the safety medical product schema). For instance, the case intake and management circuit 146 may receive encrypted structured data from the connection repository 144 and decrypt the structured data. Then, the case intake and management circuit 146 may modify the decrypted structured data, by arranging the decrypted structured data based on the safety medical product data schema and generating a data object which is specific to case intake and management (as compared to regulatory information management).

Once the provider computing system 104 has transmitted the modified structured data from the first data repository to the second data repository, the method 300 proceeds to step 316 at which the provider computing system stores the structured data in the second data repository. For instance, the information management circuit 136 may transmit the modified structured data from the medical product repository 142 to the medical product repository 152, where the modified structured data may be stored therein.

Figure 4:
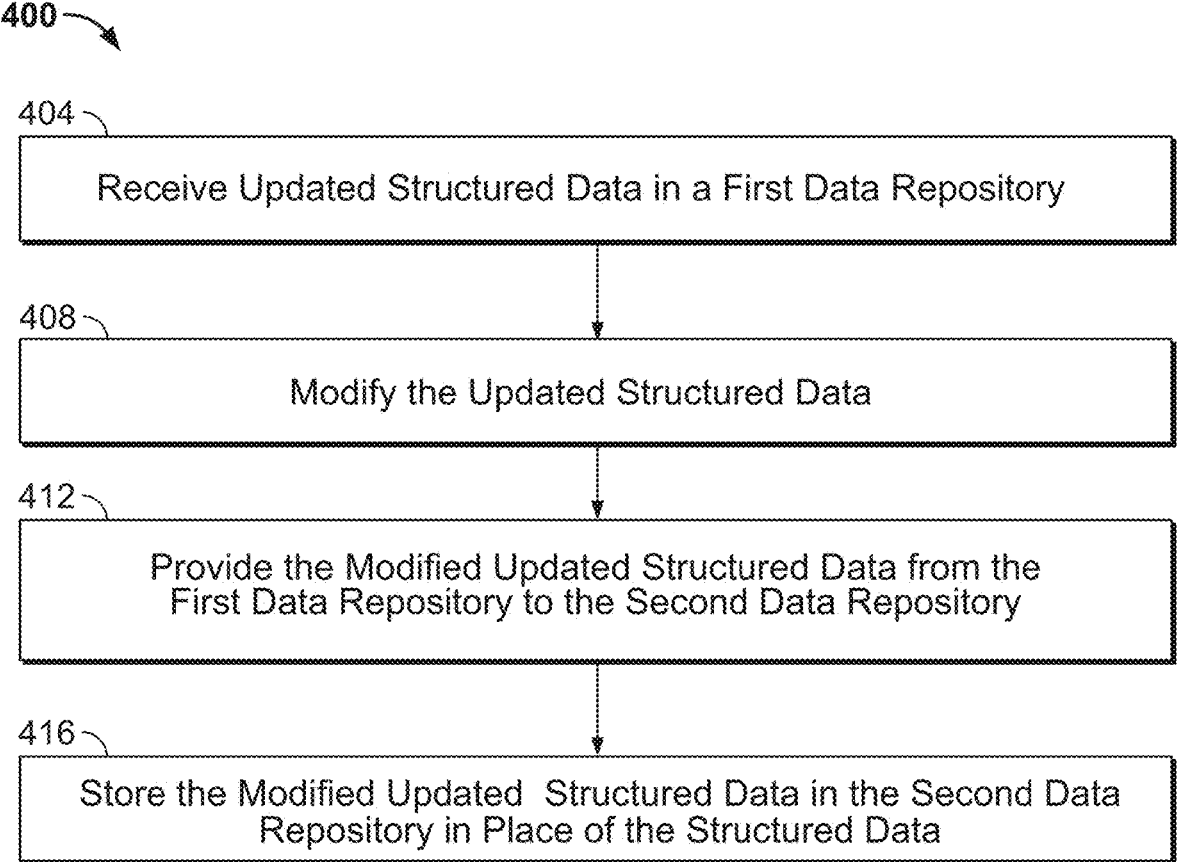
FIG. 4 may be a flow diagram of a method for reconciling the receipt of updated structured data in a first repository within a second repository, according to an example embodiment.

Referring now to FIG. 4, a method 400 of reconciling the receipt of updated structured data in a first repository within a second repository, according to an example embodiment. Method 400 can be carried out by the system of FIG. 1. More particularly, the method 400 can be carried out by the processing circuit 128 of the provider computing system 104 and through communication with the user computing devices 108 and the health agency computing systems 112.

Method 400 commences at step 404 at which the provider computing system 104 receives a change or update to structured data stored in a first data repository (e.g., the medical product repository 142). For instance, as described herein, the information management circuit 136 may receive a change to one of the pieces of structured data from one of the user computing devices 108 and/or the health agency computing systems 112. For example, the medical product repository 142 may include structured data such as an organization data object with a specific name stored in a name field. Then, the information management circuit 136 may receive a change to the name of the organization and store the changed structured data in the medical product repository 142 (e.g., in place of the previous structured data). For instance, the information management circuit 136 may update the name field and the last modified date and time of the organization data object and store the changed organization data object in the medical product repository 142. In another example, the information management circuit 136 may generate a new organization data object including each of the fields of the previous organization data object, but the new name in the name field and the updated last modified date in the date field. Then, the information management circuit 136 may store the changed structured data (e.g., the new organization data object) in the medical product repository 142.

Once the first repository has received the changed or updated structured data, the method 400 proceeds to step 408 at which the provider computing system 104 (or more specifically the information management circuit 136) modifies the changed or updated structured data. For instance, the information management circuit 136 may modify the structure data by encrypting the structured data. In some embodiments, the provider computing system 104 may not proceed to step 408 unless the connection data object of the connection repository 144 is active. For instance, if before step 408, the provider computing system 104 determines the connection data object is not active, the method 400 may end. Likewise, if the connection data object is active, the method 400 may proceed to step 408 and the provider computing system 104 (and more specifically the information management circuit 136) may modify the updated structured data by encrypting the structured data. For instance, the information management circuit 136 may retrieve the certificate of the corresponding second circuit (e.g., the case intake and management circuit 146) and encrypt the structured data based on the certificate (e.g., based on a public key of the certificate). For instance, the certificate may include the public key of the corresponding second circuit, which may be used to encrypt the data based on an encryption algorithm. For instance, the provider computing system 104 may utilize an asymmetric encryption algorithm which utilizes a private-public key pair for decryption and encryption such as the Rivest-Shamir-Adleman (RSA) encryption algorithm, the Elliptic Curve Cryptography (ECC) encryption algorithm, or other encryption algorithms.

In some embodiments, before or after step 408, the provider computing system 104 (and more specifically the information management circuit 136) may generate an outbound data object including a message or notification indicating an update to the structured data was received by the first repository. For instance, the information management circuit 136 may receive the updated structure data including an updated organization data object and store it in the medical product repository 142. Then, the information management circuit 136 may generate an outbound organization data object (e.g., as a child data object of the connection data object) including a message or notification that a change to the structured data was received and provide it to the case intake and management circuit 146.

Once the provider computing system 104 has modified the changed or updated structured data, the method 400 proceeds to step 412 at which the provider computing system 104 transmits or provides the modified updated structured data from the first data repository (e.g., the connection repository 144) to a second data repository (e.g., the shared connection repository 130, the connection repository 154, etc.). For instance, at step 412, the information management circuit 136 may transmit or provide the modified updated structured data, over the network 118, to the shared connection repository 130 or the connection repository 154. In some embodiments, the information management circuit 136 may directly provide the modified updated structured data to the case intake and management circuit 146 to reconcile the differences in structured data between the two circuits. In other embodiments, the information management circuit 136 may provide the modified updated structured data to the shared connection repository 130.

In some embodiments, at step 412, to provide the modified updated structured data from the first repository to the second repository, the second circuit (e.g., the case intake and management circuit 146) may request or select the modified structured data from the first circuit or repository. For instance, the case intake and management circuit 146 may receive an indication or notification (e.g., as part of the outbound data object) that the modified updated structured data was received by the medical product repository 142. Then, in response, the case intake and management circuit 146 may receive or request the new (modified) structured data from the information management circuit or the medical product repository 142. In some embodiments, to determine which piece or portion of the structured data was updated, the case intake and management circuit 146 may compare a last modified date and time of the inbound data object with the last modified date and time of the structured data. For instance, the case intake and management circuit 146 may compare the last modified date and time of the inbound organization data object with the last modified date of the organization data object stored in the medical product repository 142. Then, in response to the last modified date and time of the organization data object being more recent than the last modified date and time of the organization data object, the case intake and management circuit 146 may determine the organization data object was changed or updated. Accordingly, the case intake and management circuit 146 may select or query the medical product repository 142 for the updated structured data. Further, in response to receiving the modified structured data from the first circuit, the second circuit may generate the corresponding inbound data object and populate the inbound data object with the date and time the modified structured data was received and then store the inbound data object therein (e.g., in the connection repository 154).

In some embodiments, the provider computing system 104 (and more specifically the case intake and management circuit 146) may proceed through an ordered intake of the updated structured data based on the hierarchy of the safety medical product data schema. For instance, the organization data object may include a dependent medical product family data object. Similarly, the medical product family data object may include a dependent inbound medical product data object, and so on until reaching the product registration data object. Accordingly, when receiving or selecting modified structured data, the provider computing system (and more specifically the case intake and management circuit 146) may retrieve the structured data in order by selecting or retrieving first structured data (e.g., an organizational data object) having a first hierarchical level in the safety medical product data schema, then selecting or retrieving second structured data (e.g., a medical product family data object) having a second hierarchical level which depends on the first level, and so on, until reaching the lowest-level structured data. In this regard, even if only a single data object was updated (e.g., the organization data object), each dependent data object may also be updated or copied from the medical product repository 142 to ensure data integrity and proper dependencies.

In some embodiments, after step 412 (e.g., the case intake and management circuit 146 receives the modified updated structured data), the case intake and management circuit 146 may modify the structured data once again. For instance, the case intake and management circuit 146 may decrypt the modified updated structured data based on a private key stored in a key repository (not shown) which corresponds with the public key of the certificate which was used to encrypt the structured data. In some embodiments, the case intake and management circuit 146 may further modify the updated structured data based on a specific schema of the medical product repository 152 (e.g., the safety medical product schema). For instance, the case intake and management circuit 146 may receive encrypted updated structured data from the connection repository 144 and decrypt the updated structured data. Then, the case intake and management circuit 146 may modify the decrypted updated structured data, by arranging the decrypted structured data based on the safety medical product data schema and adding the decrypted updated structured data to a data object which is specific to case intake and management (as compared to regulatory information management).

Once the provider computing system 104 has transmitted the modified updated structured data from the first data repository to the second data repository, the method 400 proceeds to step 416 at which the provider computing system stores the updated structured data in the second data repository. For instance, the information management circuit 136 may transmit the modified structured data from the medical product repository 142 to the medical product repository 152, where the modified structured data may be stored therein.

Figure 5:
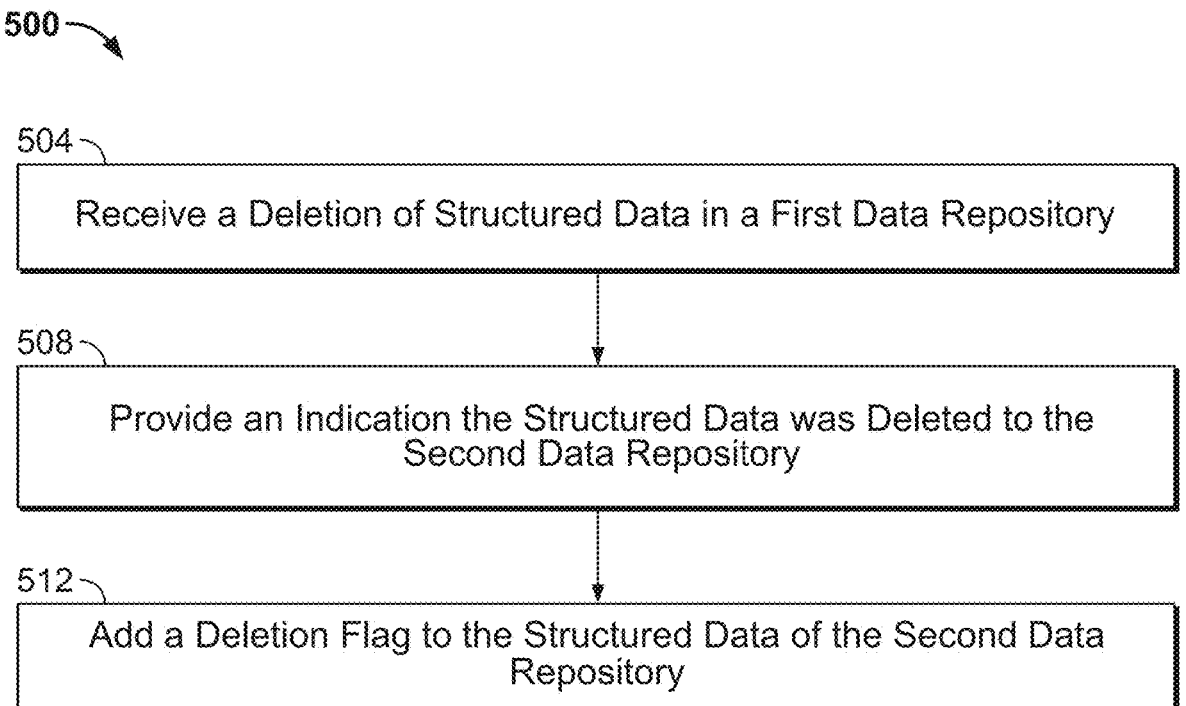
FIG. 5 may be a flow diagram of a method for reconciling the receipt of a deletion of structured data in a first repository within a second repository, according to an example embodiment.

Referring now to FIG. 5, a method 500 of reconciling the receipt of a deletion of structured data in a first repository within a second repository, according to an example embodiment. Method 500 can be carried out by the system of FIG. 1. More particularly, the method 500 can be carried out by the processing circuit 128 of the provider computing system 104 and through communication with the user computing devices 108 and the health agency computing systems 112.

Method 500 commences at step 504 at which the provider computing system 104 receives a deletion or a request to delete a piece of structured data of a first repository. For instance, as described herein, the information management circuit 136 may receive deletion or a request to delete to one of the pieces of structured data of the medical product repository 142 from one of the user computing devices 108 and/or the health agency computing systems 112. For instance, the medical product repository 142 may include structured data such as an organization data object. Then, the information management circuit 136 may receive a request to delete to the organization data object. In response, the information management circuit 136 may remove or delete the organization data object from the medical product repository 142.

Once the provider computing system 104 has received the request to delete the structural data and/or deleted the structural data from the first repository, the method 500 proceeds to step 508 at which the provider computing system 104 transmits an indication the structured data was deleted to a second data repository (e.g., the shared connection repository 130, the connection repository 154, etc.). In some embodiments, at step 508, the provider computing system 104 may generate and transmit the outbound data object which may include the indication the structural data was deleted (e.g., in the message or notification). For instance, at step 508, the information management circuit 136 may transmit or provide the corresponding outbound data object, over the network 118, to the connection repository 154.

Once the provider computing system 104 has transmitted the indicated the structured data was deleted from the first data repository to the second data repository, the method 500 proceeds to step 516 at which the provider computing system stores adds a deletion flag or indication of deletion (e.g., the deletion field being set to "true") to the structural data in the second data repository. For instance, the information management circuit 136 may transmit the outbound data object including the message the structured data was deleted from the connection repository 144 to the connection repository 154. In response, the case intake and management circuit 146 may query or search the medical product repository 142 for the structured data. Then, in response to determining it was deleted, the case intake and management circuit 146 may modify the corresponding structured data of the medical product repository 152 to include a deleted flag or indication (e.g., a "True" or "1" in the deleted field of the data object).

In some embodiments, after the methods 300, 400, or 500, the provider computing system 104 (and more specifically the case intake and management circuit 146) may generate a case dataset based on the medical product data of the medical product repository 152. For instance, the provider computing system 104 may proceed through the methods 300, 400, and/or 500 and receive structured data in the second repository. Then, the provider computing system 104 (and more specifically the case intake and management circuit 146) may receive a source file including adverse event data associated with a medical product. Next, the provider computing system 104 may search the medical product repository 152 for medical product data (e.g., structured data) that matches the medical product of the adverse event data. Next, the provider computing system 104 may generate case data including at least a portion of the adverse event data and the medical product data and generate a case dataset including the case data. Next, the provider computing system 104 may receive a request to generate an electronic submission including at least a portion of the case dataset. In response, the provider computing system 104 may generate the case dataset and output it to the user computing device 108 or the health agency computing system 112.

The embodiments described herein have been described with reference to the drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provision of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexors, registers, capacitors, inductors, diodes, wiring, and so on.

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other embodiments, two or more processors may be coupled via a bus to enable independent, parallel, pipelined, or multi-threaded instruction execution. Each processor may be implemented as one or more general purpose processors, application specific integrated circuits (ASICs), field programmable gate arrays (FPGAs), digital signal processors (DSPs), or other suitable electronic data processing components structured to execute instructions provided by the memory. The one or more processors may take the form of a single core processor, a multi-core processor (e.g., dual core, quad core, etc.), microprocessor, etc. In some embodiments, the one or more processors may be external to the apparatus. For example, the one or more processors may be a remote processor (e.g., a cloud-based processor). Alternatively or additionally, the one or more processors may be internal and/or local to the apparatus. In this regard, a circuit or components thereof may be disposed locally (e.g., as part of a local server, a local computing system) or remotely (e.g., as part of a remote server such as a cloud-based server). To that end, a "circuit" as described herein may include components that are distributed across one or more locations. Further, each of the circuits described herein may be distributed across one or more locations (e.g., each as part of one or more remote servers).

An example system for implementing the overall system or portions of the embodiments might include a general-purpose computing device in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile storage media may take the form of ROM, flash memory (e.g., flash memory such as NAND, 3D NAND, NOR, 3D NOR), EEPROM, MRAM, magnetic storage, hard disks, optical disks, etc. Combinations of the above are also included within the scope of machine-readable media. In this regard, machine-executable instructions comprise, for example, instructions and data which cause a general-purpose computer, special purpose computer, or special purpose processing machine to perform a certain function or group of functions. Each respective memory device may be operable to maintain or otherwise store data relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, a joystick, or other input devices performing a similar function. Comparatively, the term "output device," as described herein, may include any type of output device including, but not limited to, a computer monitor, printer, facsimile machine, or other output devices performing a similar function.

It should be noted that the term "field," as described herein may include any form of an input field through which the user interfaces shown and described may receive input from a user of a computing device. For instance, the term "field" may include a text field, a drop-down box and selectable options, a list box, a lookup box, a search bar, an icon, one or more checkboxes, one or more radio buttons, a button, a toggle, a date field, a slider, and the like. Further, each "field" may include and/or receive data that may be associated with a data object as described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes, and omissions may be made in the design, operating conditions and embodiment of the embodiments without departing from the scope of the present disclosure as expressed in the appended claim.

What is claimed is:

1. A method for reconciling differences between a first repository and a second repository the method comprising:
   receiving, by a first circuit associated with a first application, a request to generate a network connection between the first repository and the second repository, wherein the first repository is associated with the first application, and wherein the second repository is associated with a second application;
   generating, by the first circuit, a first connection data object including a Boolean status field including a false value;
   modifying, by the first circuit, the Boolean status field to include a true value;
   receiving, by the first circuit, structured data;
   storing, by the first repository, the structured data;
   modifying, by the first circuit, the structured data to encrypt the structured data;
   providing, by the first circuit and in response to the Boolean status field including the true value, the encrypted structured data to the second repository;
   receiving, by the first circuit, updated structured data;
   storing, by the first repository, the updated structured data;
   modifying, by the first circuit, the structured data to encrypt the modified structured data;
   providing, by the first circuit and in response to the Boolean status field including the true value, the encrypted updated structured data to the second repository;
   receiving, by the first circuit, a request to delete the updated structured data stored in the first repository;
   deleting, by the first repository, the updated structured data; and
   providing, by the first circuit and in response to the Boolean status field including the true value, an indication of the deletion of the updated structured data to the second repository.

2. The method of claim 1, further comprising:
   decrypting, by a second circuit associated with the second application, the encrypted updated structured data to determine the updated structured data;
   storing, by the second repository, the updated structured data; and
   modifying, by the second repository and in response to receiving the indication of deletion, the updated structured data to include a deletion flag.

3. The method of claim 1, wherein the Boolean status field is a first Boolean status field, wherein the false value is a first false value, wherein the true value is a first true value, and wherein the method further comprises:
   generating, by a second circuit associated with the second application, a second connection data object including a second Boolean status field including a second false value; and
   modifying, by the first circuit, the second Boolean status field to include a second true value.

4. The method of claim 3, wherein the first circuit includes a first certificate repository including a first certificate, wherein the second circuit includes a second certificate repository including a second certificate, wherein the first connection data object includes a first certificate field, wherein the second connection data object includes a second certificate field, and wherein the method further comprises:
   providing, by the first circuit, the first certificate to the second circuit;
   providing, by the second circuit, the second certificate to the first circuit;

modifying, by the first circuit, the first certificate field to include the second certificate; and modifying, by the second circuit, the second certificate field to include the first certificate.

5. The method of claim 4, wherein the first circuit encrypts the structured data based on the second certificate, and wherein the first circuit encrypts the updated structured data based on the second certificate, and wherein the method further comprises:

decrypting, by the second circuit, the encrypted structured data based on the first certificate to determine the structured data;

storing, by the second repository, the structured data;

decrypting, by the second circuit, the encrypted updated structured data based on the first certificate to determine the updated structured data; and storing, by the second repository, the updated structured data.

6. The method of claim 1, wherein the first application is a Regulatory Information Management (RIM) application.

7. The method of claim 6, wherein the second application is a Pharmacovigilance individual case safety report (ICSR) reporting application.

8. The method of claim 7, wherein the structured data is structured medical product data associated with a medical product, and wherein the method further comprises:

generating, by the second circuit, a case dataset based at least partially on the updated structured data; and outputting, by the second circuit, the case dataset to a health agency computing system.

9. The method of claim 1, wherein the structured data is structured according to a hierarchical data structure and includes a plurality of data objects including a top-level data object and a lowest-level data object, wherein the top-level data object is an organization data object associated with a customer of the first application, and wherein the lowest-level data object is a product registration data object associated with a health agency medical product registration.

10. The method of claim 9, further comprising:

receiving, by the first circuit, unstructured data;

generating, by the first circuit, the structured data by structuring the unstructured data based on the hierarchical data structure.

11. The method of claim 9, wherein the updated structured data includes a modified data object corresponding to at least one data object of the plurality of data objects of the structured data.

12. A method for reconciling differences between a first repository and a second repository the method comprising:

receiving, by a first circuit associated, a request to generate a network connection between the first repository and the second repository, generating, by the first circuit, a first connection data object including a first Boolean status field including a first false value;

modifying, by the first circuit, the Boolean status field to include a first true value;

generating, by a second circuit, a second connection data object including a second Boolean status field including a second false value;

modifying, by the first circuit, the second Boolean status field to include a second true value;

receiving, by the first circuit, structured data;

storing, by the first repository, the structured data;

providing, by the first circuit and in response to the first Boolean status field including the first true value, the structured data to the second repository;

storing, by the second repository, the structured data;

receiving, by the first circuit, updated structured data;

storing, by the first repository, the updated structured data;

providing, by the first circuit and in response to the first Boolean status field including the first true value, the updated structured data to the second repository;

storing, by the second repository, the updated structured data;

receiving, by the first circuit, a request to delete the updated structured data stored in the first repository;

deleting, by the first repository, the updated structured data;

providing, by the first circuit and in response to the Boolean status field including a true value, an indication of the deletion of the updated structured data to the second repository; and modifying, by the second repository and in response to receiving the indication of deletion, the updated structured data to include a deletion flag.

13. The method of claim 12, wherein the first circuit includes a first certificate repository including a first certificate, wherein the second circuit includes a second certificate repository including a second certificate, wherein the first connection data object includes a first certificate field, wherein the second connection data object includes a second certificate field, and wherein the method further comprises:

providing, by the first circuit, the first certificate to the second circuit;

providing, by the second circuit, the second certificate to the first circuit;

modifying, by the first circuit, the first certificate field to include the second certificate; and modifying, by the second circuit, the second certificate field to include the first certificate.

14. The method of claim 13, wherein the method further comprises:

modifying, by the first circuit, the structured data based on the second certificate to encrypt the structured data; and modifying, by the first circuit, the updated structured data based on the second certificate to encrypt the update structured data.

15. The method of claim 14, wherein the method further comprises:

decrypting, by the second circuit, the encrypted structured data based on the first certificate to determine the structured data; and decrypting, by the second circuit, the encrypted updated structured data based on the first certificate to determine the updated structured data.

16. The method of claim 12, wherein the first circuit and the first repository are associated with a first application, and wherein the second circuit and the second repository are associated with a second application.

17. The method of claim 16, wherein the first application is a Regulatory Information Management (RIM) application.

18. The method of claim 17, wherein the second application is a Pharmacovigilance individual case safety report (ICSR) reporting application.

19. The method of claim 17, wherein the structured data is structured medical product data associated with a medical product, and wherein the method further comprises:

generating, by the second circuit, a case dataset based at least partially on the updated structured data; and outputting, by the second circuit, the case dataset to a health agency computing system.

20. The method of claim 12, wherein the structured data is structured according to a hierarchical data structure and includes a plurality of data objects including a top-level data object and a lowest-level data object, wherein the top-level data object is an organization data object associated with a customer of the first application, and wherein the lowest-level data object is a product registration data object associated with a health agency medical product registration.

* * * * *